US008587652B2

(12) United States Patent
Iwanaga et al.

(10) Patent No.: US 8,587,652 B2
(45) Date of Patent: Nov. 19, 2013

(54) PARAMETER SETTING METHOD AND MONITORING APPARATUS USING THE METHOD

(75) Inventors: Kazunari Iwanaga, Kodaira (JP); Miyuki Fujii, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 759 days.

(21) Appl. No.: 12/691,805

(22) Filed: Jan. 22, 2010

(65) Prior Publication Data

US 2010/0188505 A1 Jul. 29, 2010

(30) Foreign Application Priority Data

Jan. 23, 2009 (JP) .................................. 2009-013189

(51) Int. Cl.
*H04N 7/18* (2006.01)
*G06K 9/46* (2006.01)

(52) U.S. Cl.
USPC ............................ 348/143; 348/152; 382/103

(58) Field of Classification Search
None
See application file for complete search history.

(56) References Cited

U.S. PATENT DOCUMENTS

| 6,061,055 | A  | * | 5/2000 | Marks ........................... 382/276 |
| 7,382,896 | B2 | * | 6/2008 | Ito et al. ........................ 382/103 |
| 2001/0010542 | A1 | * | 8/2001 | Takagi et al. .................. 348/152 |
| 2002/0071034 | A1 | * | 6/2002 | Ito et al. ........................ 348/152 |
| 2004/0207729 | A1 | * | 10/2004 | Takagi et al. .................. 348/152 |
| 2010/0188505 | A1 | * | 7/2010 | Iwanaga et al. ............... 348/143 |

FOREIGN PATENT DOCUMENTS

| JP | 2005-062924 | 10/2005 |
| JP | 2006-114953 | 4/2006 |

* cited by examiner

*Primary Examiner* — Scott Christensen
*Assistant Examiner* — Joiya M Cloud
(74) *Attorney, Agent, or Firm* — Brundidge & Stanger, P.C.

(57) ABSTRACT

In a monitoring apparatus for monitoring an object which intrudes into a monitoring subject area by using an image pickup device, it is demanded to adjust parameters according to conditions such as the monitoring purpose and the surrounding environment in order to execute suitable monitoring. To this end, in the monitoring apparatus, parameters corresponding to monitoring conditions are subject to grouping. Suitable values of parameters in each group obtained by the grouping are previously determined according to a degree of a monitoring condition. A monitoring condition and its degree are selected by using an ordering device having user interface components such as push buttons mounted thereon. It is made possible to instantaneously alter parameters belonging to a group corresponding to the monitoring condition all at once at this time. Parameter adjustment free from troublesomeness and skill is thus implemented.

6 Claims, 10 Drawing Sheets

FIG.8

MONITORING CONDITION SETTING

| | | | |
|---|---|---|---|
| 301 WHETHER THERE IS SHAKING OF VEGETATION | 306 NONE | 307 STANDARD | 308 STRONG |
| 302 WHETHER THERE IS SUNSHINE CHANGE | 309 NONE | 310 STANDARD | 311 STRONG |
| 303 WHETHER THERE IS VIDEO NOISE | 312 NONE | 313 STANDARD | 314 STRONG |
| 304 HEAVINESS OF PEDESTRIAN TRAFFIC (TRAFFIC) | 315 STANDARD | 316 MEDIUM | 317 HEAVY |
| 305 DETECTION SUBJECT OBJECT | 318 PEDESTRIAN | 319 TWO-WHEELED VEHICLE | 320 FOUR-WHEEL VEHICLE | 321 OTHERS |

| NAME OF MONITORING CONDITION | DEGREE OR DETAILS | SMOOTHING (3×3 MEDIAN FILTER) | THINNING (frame rate reduction) | BINARIZATION THRESHOLD | EXPANSION-REDUCTION (OPENING) | PATTERN SEARCH RANGE [pixels] | OBJECT WIDTH [meter] | OBJECT HEIGHT [meter] | OBJECT MOVING VELOCITY [m/sec] | BACKGROUND UPDATE RATE [1/sec] |
|---|---|---|---|---|---|---|---|---|---|---|
| WHETHER THERE IS SHAKING OF VEGETATION | NONE | N.C. | N.C. | 5 | N.C. | 30 | N.C. | N.C. | N.C. | N.C. |
|  | STANDARD | N.C. | N.C. | 15 | N.C. | 20 | N.C. | N.C. | N.C. | N.C. |
|  | STRONG | N.C. | N.C. | 30 | N.C. | 15 | N.C. | N.C. | N.C. | N.C. |
| WHETHER THERE IS SUNSHINE CHANGE | NONE | N.C. | N.C. | N.C. | N.C. | N.C. | N.C. | N.C. | N.C. | 0.001 |
|  | STANDARD | N.C. | N.C. | N.C. | N.C. | N.C. | N.C. | N.C. | N.C. | 0.01 |
|  | STRONG | N.C. | N.C. | N.C. | N.C. | N.C. | N.C. | N.C. | N.C. | 0.1 |
| WHETHER THERE IS VIDEO NOISE | NONE | OFF | N.C. | N.C. | OFF | N.C. | N.C. | N.C. | N.C. | N.C. |
|  | STANDARD | ON | N.C. | N.C. | OFF | N.C. | N.C. | N.C. | N.C. | N.C. |
|  | STRONG | ON | N.C. | N.C. | ON | N.C. | N.C. | N.C. | N.C. | N.C. |
| HEAVINESS OF PEDESTRIAN TRAFFIC (TRAFFIC) | NONE | N.C. | NONE | N.C. | N.C. | N.C. | N.C. | N.C. | N.C. | N.C. |
|  | MEDIUM | N.C. | 1/3 | N.C. | N.C. | N.C. | N.C. | N.C. | N.C. | N.C. |
|  | HEAVY | N.C. | 1/10 | N.C. | N.C. | N.C. | N.C. | N.C. | N.C. | 0.001 |
| DETECTION SUBJECT OBJECT | PEDESTRIAN | N.C. | N.C. | N.C. | N.C. | N.C. | 0.3 to 1 | 1 to 2 | 0.1 to 5 | N.C. |
|  | TWO WHEELED VEHICLE | N.C. | N.C. | N.C. | N.C. | N.C. | 0.5 to 2.5 | 1 to 2 | 1 to 20 | N.C. |
|  | FOUR-WHEEL VEHICLE (CAR) | N.C. | N.C. | N.C. | N.C. | N.C. | 1 to 5 | 1 to 5 | 1 to 20 | N.C. |

N.C. : Not Changed

FIG.10

| NAME OF MONITORING CONDITION | DEGREE OR DETAILS | SMOOTHING (3×3 MEDIAN FILTER) | THINNING (reduced frame rate) [fps] | BINARIZATION THRESHOLD | EXPANSION-REDUCTION (OPENING) | PATTERN SEARCH RANGE [pixels] | OBJECT WIDTH [meter] | OBJECT HEIGHT [meter] | OBJECT MOVING VELOCITY [m/sec] | BACKGROUND UPDATE RATE [1/sec] |
|---|---|---|---|---|---|---|---|---|---|---|
| COMMON | STANDARD | 0 (OFF) | 30 | 15 | 0 (OFF) | 20 | 0.3 to 1 | 1 to 2 | 0.1 to 5 | 0.01 |
| COMMON | UPPER LIMIT | 48 (7*7) | 30 | 254 | 48 (7*7) | 240 | — | — | — | 30 |
| COMMON | LOWER LIMIT | 0 (OFF) | 0.3 | 0 | 0 (OFF) | 1 | — | — | — | 0 |
| WHETHER THERE IS SHAKING OF VEGETATION | CORRELATION COEFFICIENT | 5 | 0 | 10 | 1 | -10 | 0 | 0 | 0 | 0 |
| WHETHER THERE IS SUNSHINE CHANGE | CORRELATION COEFFICIENT | 0 | 0 | 0 | 0 | 0 | 0 | 0 | 0 | -3 |
| WHETHER THERE IS VIDEO NOISE | CORRELATION COEFFICIENT | 10 | 0 | 0 | 5 | 0 | 0 | 0 | 0 | -1 |
| HEAVINESS OF PEDESTRIAN TRAFFIC (TRAFFIC) | CORRELATION COEFFICIENT | 0 | -20 | 0 | -1 | 0 | 0 | 0 | 0 | -2 |
| DETECTION SUBJECT OBJECT | PEDESTRIAN | — | — | — | — | — | 0.3 to 1 | 1 to 2 | 0.1 to 5 | — |
| DETECTION SUBJECT OBJECT | TWO-WHEELED VEHICLE | — | 0 | — | — | — | 0.5 to 2.5 | 1 to 2 | 1 to 20 | — |
| DETECTION SUBJECT OBJECT | FOUR-WHEELED VEHICLE (CAR) | — | 0 | — | — | — | 1 to 5 | 1 to 5 | 1 to 20 | — |

— : Not Defined

FIG.11

| | SMOOTHING (MEDIAN FILTER) | THINNING (reduced frame rate) [fps] | BINARIZATION THRESHOLD | EXPANSION-REDUCTION (OPENING) | BACKGROUND UPDATE RATE [1/sec] |
|---|---|---|---|---|---|
| COMPENSATION APPLICATION LOWER LIMIT | 24 (5*5) | 15 | 192 | 8 (3*3) | 0.1 |
| COMPENSATION APPLICATION UPPER LIMIT | 0 (OFF) | 1 | 15 | 0 (OFF) | 0.001 |
| SMOOTHING (MEDIAN FILTER) | 1 | 0 | -0.1 | -0.1 | 0 |
| THINNING (reduced frame rate) [fps] | 0 | 1 | 0 | 0 | 1 |
| BINARIZATION THRESHOLD | -0.1 | 0 | 1 | 0.2 | 0 |
| EXPANSION-REDUCTION (OPENING) | -0.1 | 0 | 0.2 | 1 | 0 |
| BACKGROUND UPDATE RATE [1/sec] | 0 | 1 | 0 | 0 | 1 |

PARAMETER SETTING METHOD AND MONITORING APPARATUS USING THE METHOD

INCORPORATION BY REFERENCE

The present application claims priority from Japanese application JP2009-013189 filed on Jan. 23, 2009, the content of which is hereby incorporated by reference into this application.

BACKGROUND OF THE INVENTION

The present invention relates to a monitoring apparatus for monitoring a video in an area to be monitored (monitoring subject area). In particular, the present invention relates to a parameter setting method by which a plurality of parameters used by an algorithm for detecting an object from a video can be adjusted easily by means of a GUI (Graphical User Interface).

It is conducted to monitor an object which intrudes into a monitoring subject area by using, for example, an image pickup device such as a television camera (TV camera). Furthermore, a technique for conducting monitoring which is not manned monitoring using a supervisor, but automatic monitoring using an apparatus or system.

As an example of a technique for automatically detecting an object which intrudes into a monitoring subject area, a monitoring technique using a method called background subtraction method has been widely used up to now. FIG. 4 shows an example of the background subtraction method. An object detection method using the background subtraction method includes the steps of calculating a difference in luminance (or pixel value) between an input image 401 obtained from an image pickup device or the like and a background image 402 serving as a reference in which an object to be detected is not displayed, binarizing the difference value in an obtained difference image 403 by using a predetermined threshold, and conducting monitoring by regarding that an object to be detected exists in an area which has a great difference and which appears on a binarized image 404, or there is a possibility thereof.

As methods for monitoring an object to be detected, there are an inter-frame difference method using differences among a plurality of input images obtained at different time points, and an optical flow method for detecting a motion flow in an image by calculating a motion of a local part between two images, besides the background subtraction method. A suitable method is implemented according to monitoring conditions for the monitoring subject area. In addition, movement of the detected area is tracked and a locus is obtained by, for example, continuously making a pattern search in the vicinity of the detected area. The kind of the object, such as a human being or an automobile, can be recognized on the basis of the velocity and size of the object which is being tracked.

In the monitoring apparatus, overlooking an object which has intruded and falsely recognizing a shaking motion of a tree as an object which has intruded often pose problems. However, it is possible to improve the precision of each image processing algorithm and alleviate the problems such as overlooking and false detection by adjusting parameters according to the input image. For example, a high processing precision is implemented by using the threshold in the background subtraction and the size of the pattern search range in the tracking as variable parameters and giving the parameters according to conditions of the peripheral environment. Furthermore, when the luminance difference between the object to be detected and the background is small due to foul weather such as a snowstorm, the precision of the detection can be raised by adjusting the threshold in the subtraction method to a low value.

As conventional techniques relating to the present invention, for example, there are techniques disclosed in JP-A-2005-062924 (hereafter referred to as Patent Document 1), US2008/0122949 (hereafter referred to as Patent Document 2), and JP-A-2006-114953 (hereafter referred to as Patent Document 3).

SUMMARY OF THE INVENTION

In the conventional monitoring apparatus, it is necessary to adjust parameters according to the conditions of the peripheral environment as described earlier. As the processing becomes complicated, however, the number of parameters increases. Fine adjustments of the parameters are very troublesome, and sufficient knowledge and skill concerning the algorithm become necessary, resulting in a problem. Furthermore, a fatal error in setting of one parameter brings about a result that performance cannot be obtained no matter how much other parameters are optimized. Therefore, setting using the method of trial and error is difficult.

The present invention has been made in view of these prior circumstances, and an object thereof is to provide a parameter setting method which makes it possible to adjust at least one parameter in the monitoring apparatus according to the monitoring conditions by using the GUI, and provide a monitoring apparatus using the parameter setting method.

In order to achieve the object, the monitoring apparatus using the parameter setting method according to the present invention includes an image pickup device for picking up an image in a monitored area, an object detection device for conducting processing on an input image picked up by the image pickup device, extracting an object in the monitored area, making a decision whether the extracted object is an object to be detected, and detecting an object in the monitored area, a setting device for adjusting the parameters, and an display device for displaying an output image on the basis of a result of the detection in the object detection device.

In accordance with an aspect of the present invention, a monitoring apparatus includes an image pickup device for picking up an image of a monitored area, image processing means for executing a monitoring algorithm to extract an object from an input image supplied from the image pickup device and make a decision whether the object is an object to be detected, setting means for automatically or manually setting values of a plurality of parameters used in the monitoring algorithm all at once on a display screen, according to each of a plurality of monitoring conditions containing a feature of the input image supplied from the image pickup device and information which specifies the object to be detected, the plurality of parameters being parameters corresponding to the plurality of parameters, the plurality of parameters being subject to grouping on the basis of each of the monitoring conditions, suitable values of parameters in a group corresponding to each monitoring condition being previously recorded in a parameter database, and means for altering the parameters used in the monitoring algorithm to suitable values on the basis of all or partial values of parameters in a corresponding group in the parameter database according to a monitoring condition which is set by the setting means.

Preferably, the input image is featured by at least one of a degree of vegetation shaking, a degree of a sunshine change, a degree of video noise, and a degree of a traffic quantity, and the plurality of parameters include specification of one from among a plurality of degrees obtained by dividing at least one feature of the input image.

Preferably, the parameter database retains information which indicates relations among at least two information pieces of the object to be detected, and if at least one of values of the parameters is altered, then a value of related information of the object to be detected recorded in the parameter database is also automatically adjusted jointly.

Preferably, the setting means includes a GUI (graphical user interface), a suitable value of a parameter used in a monitoring algorithm corresponding to each monitoring condition is associated with GUI components on a GUI screen, monitoring conditions are displayed on the GUI screen so as to be able to be watched and recognized, and the parameters associated with the GUI can be altered immediately by manipulating the GUI components.

Preferably, the plurality of parameters include at least two selected from among smoothing, thinning, a binarization threshold, expansion-reduction, a pattern search range, an object width, an object height, an object moving velocity, and a background update rate.

In accordance with another aspect of the present invention, a parameter setting method for setting values of a plurality of parameters used in a monitoring algorithm which is executed in image processing means to extract an object from an input image supplied from an image pickup device and make a decision whether the object is an object to be detected, the parameter setting method includes the steps of grouping the plurality of parameters corresponding to a plurality of monitoring conditions containing a feature of the input image supplied from the image pickup device and information which specifies the object to be detected, on the basis of each of the monitoring conditions, and previously recording suitable values of parameters in a group corresponding to each monitoring condition in a parameter database, setting automatically or manually values of a plurality of parameters used in the monitoring algorithm all at once on a display screen, according to each of a plurality of monitoring conditions, and altering the parameters used in the monitoring algorithm to suitable values on the basis of all or partial values of parameters in a corresponding group in the parameter database according to information of a monitoring condition which is set by the setting.

In other words, in a monitoring apparatus, a plurality of parameters relating to subjective monitoring conditions are subject to grouping. In addition, suitable values of parameters in each group obtained by the grouping are previously determined. A monitoring condition is selected by using an ordering device having a GUI such as push buttons mounted thereon. It is made possible to instantaneously alter parameters belonging to a group corresponding to the monitoring condition in a lump at this time. Parameter adjustment with troublesomeness and skill excluded is thus made possible.

JP-A-2005-062924 (Patent Document 1) relates to a three-dimensional object recognition apparatus and its setting method. With the object of facilitating the propriety confirmation and setting of parameters used in recognition processing in the three-dimensional object recognition apparatus, the following method is disclosed. In order to facilitate the propriety confirmation and setting of parameters used in the image pickup device, a three-dimensional model is generated on the basis of a three-dimensional coordinate system determined from the relative position relations (the installation height, angle of depression, and normal angle) between the image pickup device and the road surface. The three-dimensional model is displayed so as to be superposed on an image picked up. Discrepancy between images can be grasped at a glance by comparing the three-dimensional model with the image picked up. According to the disclosure, therefore, a decision can be made easily whether the parameters are adequate. If parameter adjustment is judged to be necessary, then parameters can be input or altered on a parameter confirmation screen. Each time parameters are altered, however, recirculation of the three-dimensional model is executed. It is described that the user can adjust the parameters while confirming the three-dimensional model updated each time. On the other hand, according to the present invention, parameters corresponding to monitoring conditions are subject to grouping. Suitable values of parameters in each group obtained by the grouping are previously determined. A monitoring condition is selected by using an ordering device having user interface components such as push buttons mounted thereon. It is made possible to instantaneously alter parameters belonging to a group corresponding to the monitoring condition in a lump at this time. Such a configuration is not described in JP-A-2005-062924 (Patent Document 1).

US2008/0122949 (Patent Document 2) relates to a method, and apparatus, for forming parameter values of a camera. A method for reconstructing parameter values of input data obtained from cameras in order to make images obtained from a plurality of cameras such as surveillance cameras disposed in different places easy to watch is disclosed. In other words, image data are acquired from a plurality of cameras, and image data obtained from the cameras are buffered to display the buffered image data. At least one parameter value concerning a first subset of the cameras is altered. Then, the at least one parameter value is transmitted to the first subset of the cameras, and altered image data from a second subset of the cameras is acquired. Buffered image data concerning the second subset of the cameras is replaced by the altered image data concerning the second subset of the cameras. Finally, stored image data concerning the cameras is displayed.

JP-A-2006-114953 (Patent Document 3) relates to the image pickup device, and relates to a technique for making it possible to discriminate a standard preset value of the image pickup function and a present value altered by the user on the display.

According to the conventional techniques, it is necessary to previously set parameters of each image processing algorithm in detail for each video obtained from the image pickup device used in the monitoring apparatus according to monitoring conditions such as the contrast or magnitude of disturbance noise in the input image picked up. Therefore, enormous work is needed to install or add the monitoring apparatus or alter the use condition.

In a parameter setting method and a monitoring apparatus according to the present invention, a user or an administrator inputs monitoring conditions such as a monitoring purpose and video features of the input image. As a result, alteration to suitable parameter values which are preset beforehand so as to be associated with each monitoring condition is made possible. The troublesomeness and expert skill in parameter adjustment work caused by installation or addition of the monitoring apparatus and an alteration of the use condition are reduced, and more efficient operation of the monitoring apparatus becomes possible.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram of an example of an input video for explaining a parameter setting method according to the present invention;

FIG. 9 is a diagram showing an example of a table structure in a parameter database used in an embodiment of the present invention;

FIG. 10 is a diagram showing an example of a table structure in a parameter database used in another embodiment of the present invention; and FIG. 11 is a diagram showing an example of a compensation table included in the parameter database shown in FIG. 10.

DETAILED DESCRIPTION OF THE EMBODIMENTS

Hereafter, embodiments of a parameter setting method and a monitoring apparatus using the method according to the present invention will be described with reference to the drawings.

(First Embodiment)

Figure 1:
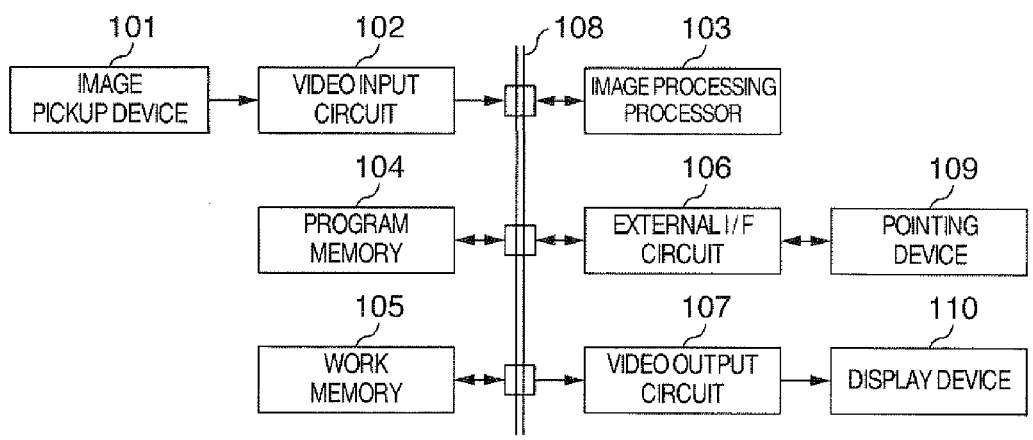
FIG. 1 is a diagram for explaining a configuration in an embodiment of the present invention.

FIG. 1 is a diagram showing a configuration of a monitoring apparatus according to the present invention. The monitoring apparatus includes an mage pickup device 101, a video input circuit 102, an image processing processor 103, a program memory 104, a work memory 105, an external I/F circuit 106, a video output circuit 107, a bus 108, a pointing device 109, and a display device 110.

The image pickup device 101 picks up an image of a subject area. The picked up input image is recorded in the work memory 105 via the video input circuit 102. The image processing processor 103 conducts processing on the input image recorded in the work memory 105 in accordance with a program recorded in the program memory 104, and displays a result of the processing on the display device 110 via the video output circuit 107. The image processing processor 103 conducts processing on the input image while altering and modifying parameters of the program on the basis of an order given by an operator using the pointing device 109 such as, for example, a mouse and a keyboard. The video input circuit 102, the image processing processor 103, the program memory 104, the work memory 105, the external I/F circuit 106 and the video output circuit 107 are connected to the bus 108.

Figure 2:
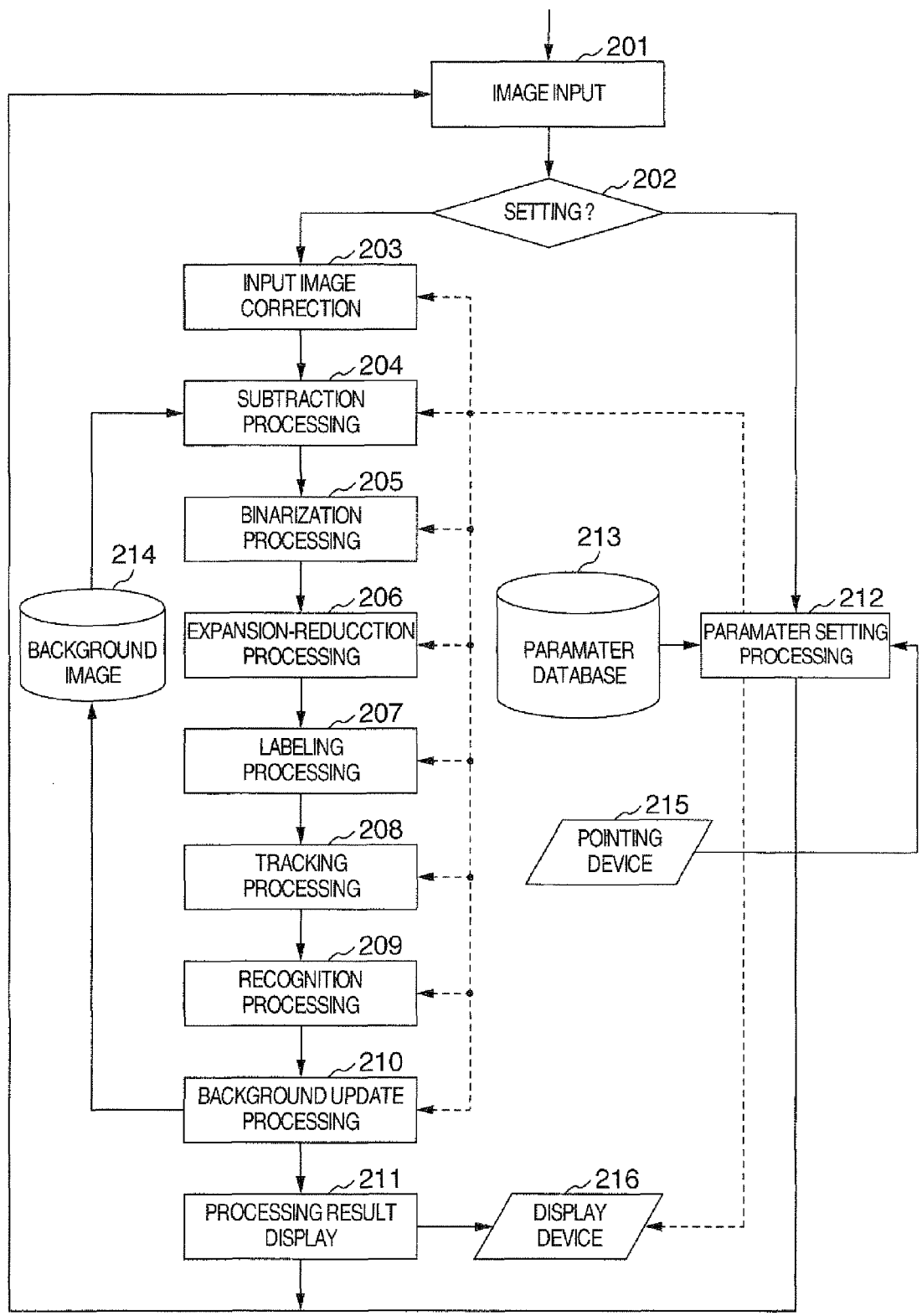
FIG. 2 is a flow chart for explaining operation in an embodiment of the present invention.

FIG. 2 shows a flow chart of processing of the program executed by the image processing processor 103 in the present embodiment. Besides processing steps 201 to 212, a parameter database 213 and a background image 214 recorded in the work memory 106, the pointing device 109, and the display device 110 are also shown in FIG. 2 in order to make the description intelligible. Arrows indicated by dotted lines represent data flows.

At an image input step 201, the latest (current) one frame of the video picked up the image pickup device 101 is transferred to the work memory 105 via the video input circuit 102.

At a setting decision step 202, branching to a parameter setting processing step 212 is conducted if a setting order of the operator is given from the pointing device 109 via the external I/F circuit 106 after the setting decision step 202 was executed last time. Otherwise, branching to an input image correction step 203 is conducted.

At the input image correction step 203, the input image is corrected with the object of removing noise in the input image and reducing the processing quantity. Here, for example, smoothing on the input image and thinning of pixels are executed according to parameters which are read out from the parameter database 213 in response to an order from the pointing device 109. In smoothing, for example, a median filter or an averaging filter is used.

Figure 4:
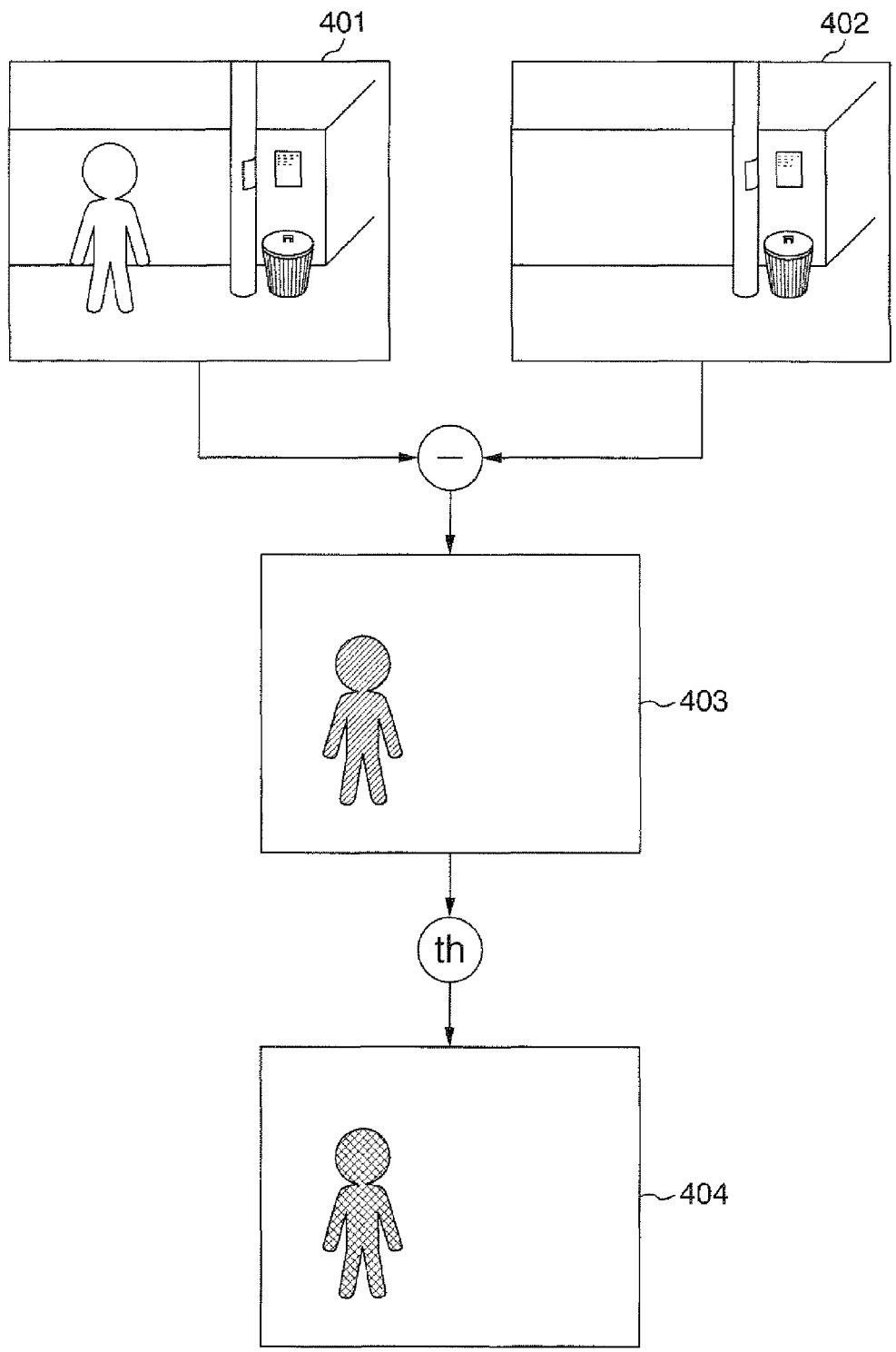
FIG. 4 is a diagram showing a flow of the conventional subtraction method used widely.

At a subtraction processing step 204, a difference between the input image 401 (see FIG. 4) which is input at the image input step 201 and the background image 214 recorded in the work memory 105 is calculated every pixel to obtain the difference image 403.

Then, at a binarization processing step 205, the value of each pixel in the difference image 403 is compared with a predetermined threshold (for example, 20 supposing the one pixel has eight bits). Conversion is conducted by regarding a pixel having a value which is at least the threshold as true (255) and a pixel having a value less than the threshold as false (0). As a result, the binarized image 404 is obtained. The threshold is read out from the parameter database 213 and given at the parameter setting processing step 212 in response to an order from the ordering device 109.

Then, at an expansion-reduction processing step 206, expansion (dilation) processing and reduction (erosion) processing are executed with the object of removing noise in the binarized image 404. If even one pixel having a pixel value "255" exists in one of four pixels neighboring a specific pixel or eight pixels neighboring the specific pixel, the specific pixel is provided with a pixel value "255." This is the expansion (dilation) processing. If even one pixel having a pixel value "0" exists in one of four pixels neighboring a specific pixel or eight pixels neighboring the specific pixel, the specific pixel is provided with a pixel value "0." This is the reduction (erosion) processing. The kind of processing executed at the expansion-reduction processing step 206 and the number of times of execution of each processing are read out from the parameter database 213 and given at the parameter setting processing step 212.

At a labeling processing step 207, clusters having the value of "255" in the binarized image 404 are assigned numbers so as to be able to discriminate the clusters in processing. Each of the clusters or a circumscribed rectangle of the cluster is called ROI (Region of Interest).

At a tracking processing step 208, a pattern search is made in the periphery of a ROI in which each of the labeled clusters exists between a preceding frame and a subsequent frame, ROIs which have nearly coincided in position and shape or size are regarded the same in the preceding frame and the subsequent frame, and the ROI is tracked. The range of the pattern search and the decision criterion of the pattern coincidence are read out from the parameter database 213 and given at the parameter setting processing step 212.

At a recognition processing step 209, the kind of the tracked ROI is recognized and a decision is made whether to detect the area as a monitoring subject. In the recognition processing, the size of the area and movement velocity are used as criteria. For example, a human being is defined as a ROI having a width in the range of 0.3 to 1 m, a height in the range of 1 to 2 m, and a velocity in the range of 0.1 to 5 m/sec. An automobile is defined as a ROI having a width in the range of 1 to 5 m, a height in the range of 1 to 5 m, and a velocity in the range of 1 to 20 m/sec. For example, when there is a ROI having a width of 0.5 m, a height of 1.7 m and a velocity of 1 m/sec in the monitored area, the ROI is recognized as a "human being." An ROI which does not match defined conditions is regarded as noise, and the ROI is not handles as a detection subject. Kinds of the subject to be detected and their decision criteria are read out from the parameter database 213 and given at the parameter setting processing step 212.

At a background update processing step 210, the background image 214 recorded in the work memory 105 is updated by using the input image obtained at the image input step 201. As for the update, the background image 214 can be always kept in the latest state while following an illuminance change such as a weather change in the monitoring environment by generating a new background image with, for example, a method such as the moving average of the background image 214 and the input image in every pixel. The update rate of the background at the background update processing step 210 is read out from the parameter database 213 and given at the setting processing step 212.

At a processing result display step 211, decision results, such as the kind and position of an area judged at the recognition processing step 209 to be an object to be detected and a locus obtained by tracking the area, are displayed on, for example, the display device 110. If the processing at the processing result display step 211 is finished, then the processing returns to the image input step 201.

Figure 3:
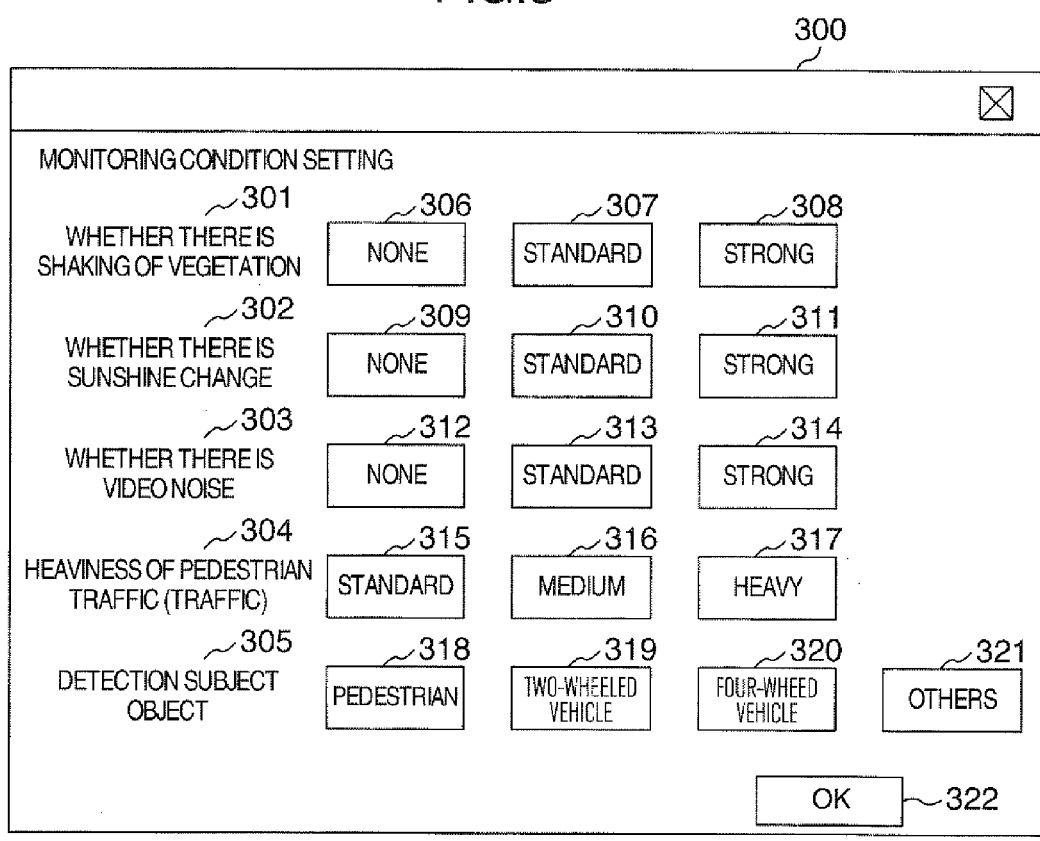
FIG. 3 is a diagram of an example for explaining a parameter setting method according to the present invention.

On the other hand, at the parameter setting processing step 212 which is the destination of the branching at the time when it is judged at the setting decision step 202 that an operator's order has been given by the pointing device 109 via the external I/F circuit 106, first a decision is made whether the processing at the setting decision step 202 is executed for the first time. If the processing at the setting decision step 202 is executed for the first time, a user interface (window) as shown in FIG. 3 is displayed on the display device 110 to be ready to accept an operator's setting order. Then, the setting order which has become the base of the decision at the setting decision step 202 is interpreted. An order which coincides with the setting order is found from the parameter database 213 recorded in the work memory 105, and a plurality of parameters to be altered are read out. Setting is conducted so as to make the parameters utilizable in the range of the input image correction step 203 to the background update processing step 210. The parameters are stored in, for example, a (shared) memory area which can be accessed by these steps or parent tasks of these steps.

FIG. 9 shows a table structure of the parameter database 213.

The parameter database 213 includes parameters such as, for example, whether the smoothing processing is executed and the kind of the smoothing processing, the number of pixels in the range subject to the smoothing processing, and the thinning rate at the input image correction processing step 203, the threshold at the binarization processing step 205, whether to execute the processing at the expansion-reduction processing step 206 and its kinds, the number of pixels representing the range of the pattern search at the tracking processing step 208, and the width, height and velocity of the object to be detected at the recognition processing step 209. The parameters are assigned to the axis of the abscissa in the table. These parameters are classified into groups which are less in number than parameters, according to subjective monitoring conditions, such as the monitoring environment and the subject to be detected, which can be understood sensually by a human being. The ordinate axis of the table indicates monitoring conditions (groups), and they are classified into whether there is shaking of vegetation, whether there is a sunshine change, whether there is video noise, heaviness of pedestrian traffic (traffic), and a detection subject object. These monitoring conditions are provided with names so as to make it possible to clearly understand conditions under which alteration should be made or a behavior change of the monitoring apparatus caused by the alteration. These are also conditions which are apt to cause overlooking or false detection. A value of each parameter is stored in a place specified by the ordinate axis and the abscissa axis of the table. In each monitoring condition, N.C. (Not Changed) means that the parameter does not belong to that monitoring condition (group) and the parameter is not altered even if a setting order concerning the monitoring condition is given.

Referring back to FIG. 3, names of monitoring conditions are indicated in 301 to 305.

Buttons 306 to 321 arranged on the right side of the monitoring conditions 301 to 305 are associated with the second column of the parameter database 213 shown in FIG. 8. The parameter and its value to be altered by depression of the button can be read out from the parameter database 213. In this way, manipulation on a monitoring condition (group) is accepted and a plurality of parameters belonging to the monitoring condition are altered all at once in a lump.

For example, the condition indicated by the monitoring condition "whether there is shaking of vegetation" 301 is an item aiming at suppressing false detection caused by shaking of vegetation in the input image. It is necessary to alter parameters such as the threshold (luminance difference in 256 steps) at the binarization processing step 205 and the range (the number of pixels) in the pattern search at the tracking processing step 208. If the shaking of the vegetation exits in a standard manner, then values of those parameters are set equal to "15" and "20," respectively and associated with a button "standard" 307. If the shaking of the vegetation is very strong, the values of the parameters are set equal to "30" and "15," respectively and associated with a button "strong" 308. If the shaking of the vegetation does not exist like indoors, the values of the parameters are set equal to "5" and "30," respectively and associated with a button "none" 306. If the image is picked up from the distance, then the vegetation shaking does not exhibit a large pixel value in the difference image in most cases. Therefore, the vegetation shaking can be excluded by providing the threshold with a large value. As for the range of the pattern search, it should be made narrow to prevent influence of disturbance, unless it is necessary to track a fast moving object to be detected.

Watching the strength of the vegetation shaking in the input image, the user selects one button conforming to the condition from among the buttons 306 to 308 on the GUI shown in FIG. 3 and then depresses an "OK" button 322. As a result, it is possible to immediately alter both the threshold and the pattern search range which are the parameters to values associated with depressed one of the buttons 306 to 308.

Each of other monitoring conditions is also associated with parameters to be altered and values of the parameters, in the same way as "whether there is vegetation shaking" 301. For example, as for a monitoring condition "whether there is a sunshine change" 302, the background update rate at the background update processing step 210 corresponds thereto. For example, if the sunshine change is very strong, then the background update rate is set equal to 0.1 frames per second and associated with a button "strong" 311. A background update rate of 0.01 frames per second is associated with a button "standard" 310. A background update rate of 0.001 frame per second is associated with a button "none" 309.

A monitoring condition "whether there is video noise" 303 is associated with, for example, whether to execute the smoothing processing and its coefficient at the input image correction step 203, and whether to execute the expansion processing and reduction processing and its kind at the expansion-reduction processing step 206. If a button "standard" 313 is depressed, then for example, an execution flag of a 3×3 median filter is made valid as smoothing and an execution flag of the expansion and reduction processing is turned off. If a button "strong" 314 is depressed, then for example, an execution flag of the 3×3 median filter is made valid as smoothing, and an execution flag of opening processing in which the reduction processing and the expansion processing are conducted on the vicinity of four pixels in order once is made valid. If a button "none" 312 is depressed, then all execution flags of the smoothing and the expansion and reduction processing are made invalid.

In a monitoring condition "heaviness of the pedestrian traffic (traffic)" 304, for example, the processing quantity at the time when the traffic of men and automobiles is heavy is reduced by altering, for example, whether to execute the pixel thinning and the thinning quantity at the input image correction step 203, and the background update rate at the background update processing step 210. Depression of the buttons 306 to 317 need only cause alterations of the corresponding parameters by overwriting, and manipulation of the buttons 306 to 320 (selection states of buttons) in the past is not necessarily stored. For example, if the monitoring condition "whether there is a sunshine change" 302 is set to "strong" and then the monitoring condition "heaviness of the pedestrian traffic (traffic)" 304 is set to "heavy," then the later setting is given priority and the background update becomes 0.001.

In a "detection subject object" 305, for example, the user selects only one or more objects of the kind the user desires to detect from among "pedestrian," "two-wheeled vehicle," and "four-wheeled vehicle." At the recognition processing step 209, only objects of the kind selected on the interface are detected and displayed on the display device. For example, it is now supposed that the pedestrian is defined as an object having a width in the range of 0.3 to 1 m, a height in the range of 1 to 2 m, and a velocity in the range of 0.1 to 5 m/second, the four-wheeled vehicle is defined as an object having a width in the range of 1 to 5 m, a height in the range of 1 to 5 m, and a velocity in the range of 1 to 20 m/second, and the two-wheeled vehicle is defined as an object having a width in the range of 0.5 to 2.5 m, a height in the range of 1 to 2 m, and a velocity in the range of 1 to 20 m/second. For example, if both a button "pedestrian" 318 and a button "four-wheeled vehicle" 320 are selected and the "OK" button 322 is depressed, then only an object having a size and a velocity which satisfy a definition of either the pedestrian or four-wheeled vehicle is detected. In other words, only in the "detection subject object" 305, manipulations on the buttons 318 to 321 (button selection states) in the past are stored, and it is possible to bring about a state in which a plurality of arbitrary buttons are depressed.

Figure 5:
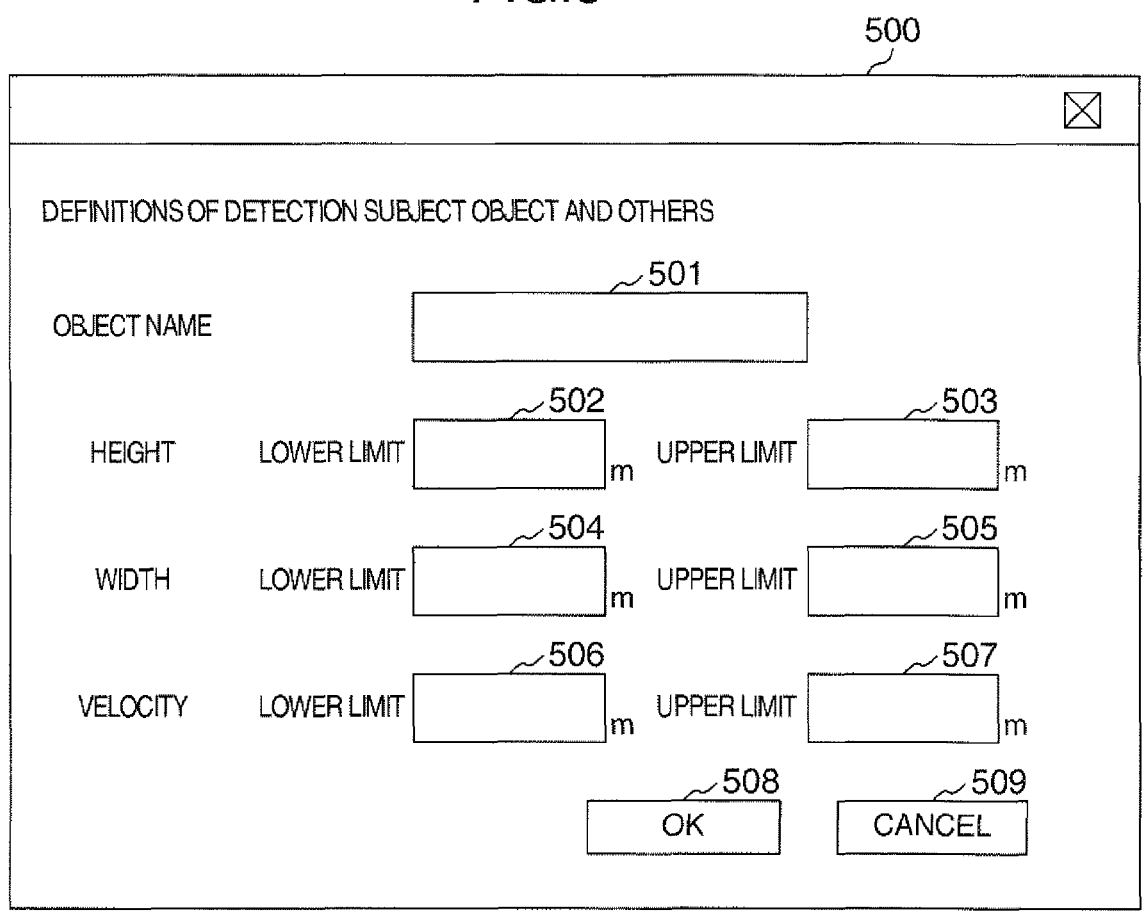
FIG. 5 is a diagram of an example for explaining a parameter setting method according to the present invention.
Figure 6:
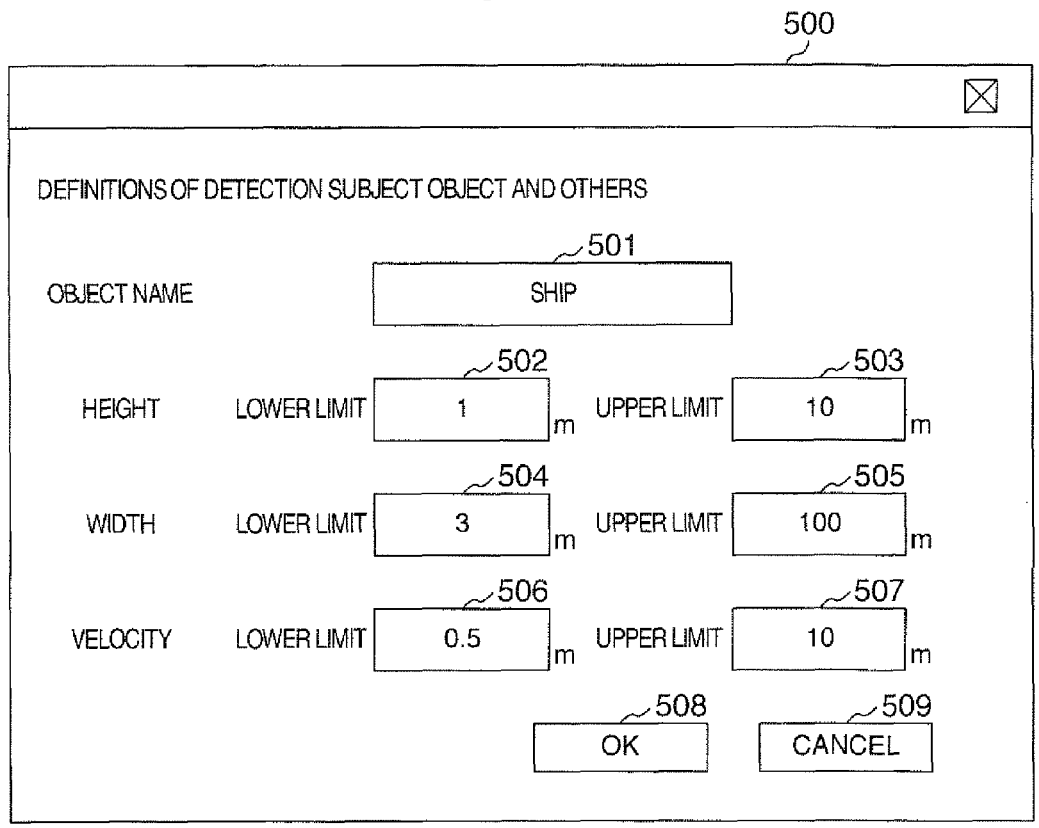
FIG. 6 is a diagram of an example for explaining a parameter setting method according to the present invention.

A button "others" 321 makes it possible, for example, for the user to directly input arbitrary parameter values. If the button "others" 321 is depressed, then, for example, a setting interface 500 shown in FIG. 5 is displayed. If, for example, the user desires to determine the ship as the detection subject, then parameter setting for detecting the ship can be generated by inputting the width, height and velocity of the object to the setting interface 500 as parameters. For example, the user enters "ship" into a object name column 501, "1" m into a height lower limit column 502, "10" m into a height upper limit column 503, "3" m into a width lower limit column 504, "100" m into a width upper limit column 505, "0.5" m into a velocity lower limit column 506, and "10" m into a velocity upper limit column 507, and depresses an OK button 508. As a result, detection meeting the input conditions becomes possible.

Figure 7:
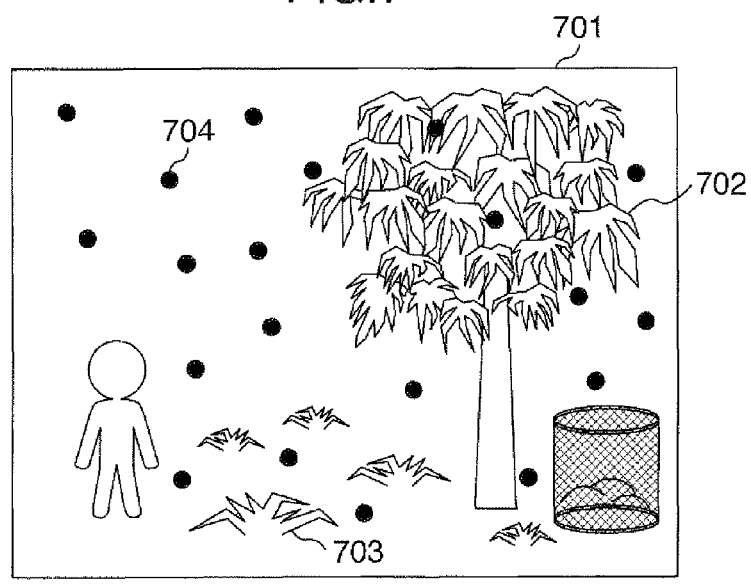
FIG. 7 is a diagram of an example of an input video for explaining a parameter setting method according to the present invention.

At the present parameter setting processing step, suitable values (uniquely determined absolute values) of parameters of algorithms corresponding to a monitoring condition such as "whether there is shaking of vegetation" 301 or "whether there is video noise" 302 are determined beforehand, and a plurality of parameters can be immediately altered to values suited to each monitoring condition in a lump by depressing the buttons 306 to 321 corresponding to each monitoring condition, as heretofore described. If, for example, the monitoring apparatus according to the present embodiment is applied to the input video 701 shown in FIG. 7 and it is desired to find an intruding pedestrian, and vehicle, then "strong" 308 is selected for "whether there is vegetation shaking" 301 in the monitoring condition setting screen 300, because the input video 701 is an outdoor video containing large images of a tree 702 and grass 703 and there is a fear that false detection will be caused by shaking of the vegetation. As for the monitoring condition "whether there is a sunshine change" 302, the "standard" button 310 is selected, because the video is a standard outdoor video. As for the monitoring condition "whether there is video noise" 303, the "strong" button 314 is depressed, because black colored video noise 704 is found here and there. As for the monitoring condition "heaviness of the pedestrian traffic (traffic)" 304, a "standard" button 315 is depressed because it is hard to suppose that a large number of people go through due to the grassy place. As for the "detection subject object" 305, the three buttons, i.e., the "pedestrian" button 318, the "two-wheeled vehicle" 319 and the four-wheeled vehicle" 320 are depressed and the "OK" button 322 is depressed. An example of the monitoring condition setting at the time when processing is conducted on the input image 701 is shown in FIG. 8.

Besides the user interface shown in FIGS. 3 and 8, an interface for directly providing parameters with numerical values is also provided for experts in the same way as the conventional technique. However, the parameter database 213 itself is not altered.

If certain one parameter belongs to a plurality of monitoring conditions (groups), a priority order among groups may be prescribed instead of giving priority to later setting uniformly.

(Second Embodiment)

A monitoring apparatus according to the present embodiment differs from the first embodiment in that a standard value and a correlation coefficient are stored in the parameter database instead of storing a parameter having an absolute value.

A table structure of a parameter database 241 in the monitoring apparatus according to the present embodiment is shown in FIG. 10.

Each parameter has a standard value irrespective of the monitoring condition. A correlation coefficient is prescribed for each monitoring condition.

On the other hand, in the user interface as well, a slider is provided for each monitoring condition instead of the buttons 306 to 317 in the first embodiment. The slider has a knob which can be changed in position to the left or right. For example, a numerical value in the range of −1 to 1 can be acquired according to the position of the knob. In the present embodiment, the left end is associated with "none," the center is associated with "standard," and the right end is associated with "strong (strongest)."

Each parameter is obtained by adding a standard value to a sum of products of slider numerical values and correlation coefficients for respective monitoring conditions.

In the present embodiment, it is made the basis to reflect the monitoring conditions to the parameters via the correlation coefficients, and the priority order is not provided unlike the first embodiment. Therefore, it is facilitated to restore the setting to the original state, resulting in a great convenience to fine adjustment. However, there is a possibility that an undesirable parameter will be obtained according to an unpredicted combination of monitoring conditions.

In the case where influences exerted upon the monitoring process result by at least two parameters are related, therefore, altering at least one of the values of the parameters beyond a determinate value may cause alteration (modification) of other values of the related parameters jointly so as to be able to automatically adjust the related parameters. The automatic adjustment is conducted when a parameter has exceeded a determinate value no matter whether the user interface is the user interface of the slider form or the expert interface.

A compensation table included in the parameter database 241 in the present embodiment is shown in FIG. 11. With respect to each of parameters in the uppermost column, the compensation table retains a compensation lower limit value, a compensation upper limit value, and compensation ratios for other parameters. If the value of the parameter becomes greater than the compensation lower limit value, compensation is conducted. If the value of the parameter becomes less than the compensation upper limit value, compensation is conducted. When a parameter in the uppermost column has exceeded the compensation lower limit value by one, another parameter is compensated by a quantity indicated by the compensation ratio. The compensation ratio is normalized by the difference between the upper limit value and the lower limit value of each parameter shown in FIG. 10.

For example, in a video which is low in contrast between the detection subject and the background, overlooking can be suppressed by using the expert interface and setting the binarization threshold to a low value. As a subsidiary effect brought about by setting the binarization threshold to a low value, however, there is a demerit that video noise in the input image becomes apt to be falsely detected. On the other hand, the false detection caused by the video noise can be excluded by conducting opening processing at the expansion-reduction processing step 206.

For example, therefore, opening processing in at least four neighboring pixels (3*3 kernel opening processing) is set to be executed at the expansion-reduction processing step 206 automatically jointly when the binarization threshold is lowered to "15" or less. If the opening in four neighboring pixels is already set, it is modified to stronger opening.

In the first and second embodiments described heretofore, it is also possible to use a configuration in which the user can freely preset the monitoring conditions handled at the parameter setting processing step, kinds of parameters to be altered, and parameter values. The GUI shown in FIG. 3 takes the form of selecting a monitoring condition by using a push button. Alternatively, however, the GUI shown in FIG. 3 may be executed with a form of selecting a monitoring condition by using other GUI components such as, for example, check boxes, radio buttons, a pull-down menu, a form of selecting a degree of a monitoring condition stepwise by using a slider, or a dialog form using wizard.

The present invention can be utilized in monitoring apparatuses. However, the present invention is not restricted to them.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A monitoring apparatus comprising:
an image pickup device for picking up an image of a monitored area; and
an image processor for executing a monitoring algorithm to extract an object from an input image supplied from the image pickup device and make a decision whether the object is an object to be detected,
wherein said image processor automatically sets values of a plurality of parameters used in the monitoring algorithm all at once on a display screen according to items of monitoring conditions, each of the items representing a different feature of a monitoring environment or information which specifies the object to be detected, each of the items having a name understandable to a user, and degree or kind of the item being set by the user,
wherein each parameter of the plurality of parameters is a value related to at least one of the items of the monitoring environment that affects detection of the object to be detected, the plurality of parameters being subject to grouping in groups, each group corresponding to one of the items of monitoring conditions such that suitable values of parameters in the group are related to the corresponding item of monitoring condition, and the plurality of parameters being previously recorded in a parameter database,
wherein said image processor alters the parameters used in the monitoring algorithm to suitable values based on all or partial values of parameters in a corresponding group in the parameter database when one of the items is set by the user,
wherein the feature of the monitoring environment includes at least one of a degree of vegetation shaking, a degree of a sunshine change, a degree of video noise, and a degree of a traffic quantity,
wherein each item of the monitoring conditions is previously divided depending on its degree or the kind and set by choosing one from among a plurality of buttons respectively representing the divided degrees or kinds,
wherein the parameter database retains information which indicates interactions among at least two parameters of the plurality of parameters, and
wherein if at least one of values of the parameters is altered, then a value of related parameter used in the monitoring algorithm is also automatically adjusted jointly.

2. The monitoring apparatus according to claim 1, wherein the image processor provides a GUI (graphical user interface),
wherein suitable values of a parameter used in the monitoring algorithm corresponding to each item of monitoring condition is associated with GUI components on a GUI screen,
wherein the names of items are displayed on the GUI screen so as to be able to be watched and recognized, and
wherein the parameters associated with the GUI can be altered immediately by manipulating the GUI components.

3. The monitoring apparatus according to claim 1, wherein the plurality of parameters comprise at least two selected from among smoothing, thinning, a binarization threshold, expansion-reduction, a pattern search range, an object width, an object height, an object moving velocity, and a background update rate.

4. A parameter setting method for setting values of a plurality of parameters used in a monitoring algorithm which is executed in an image processor to extract an object from an input image supplied from an image pickup device and make a decision whether the object is an object to be detected, the parameter setting method comprising the steps of:

grouping the plurality of parameters in groups, each group corresponding to one of items of monitoring conditions such that suitable values of parameters in the group are related to the corresponding item of monitoring condition, each of the items representing a different feature of a monitoring environment or information which specifies the object to be detected, each of the items having a name understandable to a user, and degree or kind of the item being set by the user, and the plurality of parameters being previously recorded in a parameter database;

setting automatically values of a plurality of parameters used in the monitoring algorithm all at once on a display screen, according to items of monitoring conditions; and altering the parameters used in the monitoring algorithm to suitable values based on all or partial values of parameters in a corresponding group in the parameter database when one of the items is set by the user, wherein the feature of the monitoring environment includes at least one of a degree of vegetation shaking, a degree of a sunshine change, a degree of video noise, and a degree of a traffic quantity, wherein each item of the monitoring conditions is previously divided depending on its degree or the kind and set by choosing one from among a plurality of buttons respectively representing the divided degrees or kinds, wherein the parameter database retains information which indicates interactions among at least two parameters of the plurality of parameters, and wherein if at least one of values of the parameters is altered, then a value of related parameter used in the monitoring algorithm is also automatically adjusted jointly.

5. The parameter setting method according to claim 4, wherein the setting step provides a GUI (graphical user interface), wherein suitable values of a parameter used in the monitoring algorithm corresponding to each item of monitoring condition is associated with GUI components on a GUI screen, wherein the names of items are displayed on the GUI screen so as to be able to be watched and recognized, and wherein the parameters associated with the GUI can be altered immediately by manipulating the GUI components.

6. The parameter setting method according to claim 4, wherein the plurality of parameters comprise at least two selected from among smoothing, thinning, a binarization threshold, expansion-reduction, a pattern search range, an object width, an object height, an object moving velocity, and a background update rate.

* * * * *